Aug. 19, 1969  S. M. GRAY  3,462,731
ALARM FOR VEHICLE SAFETY BELTS
Filed Jan. 3, 1966  3 Sheets-Sheet 1
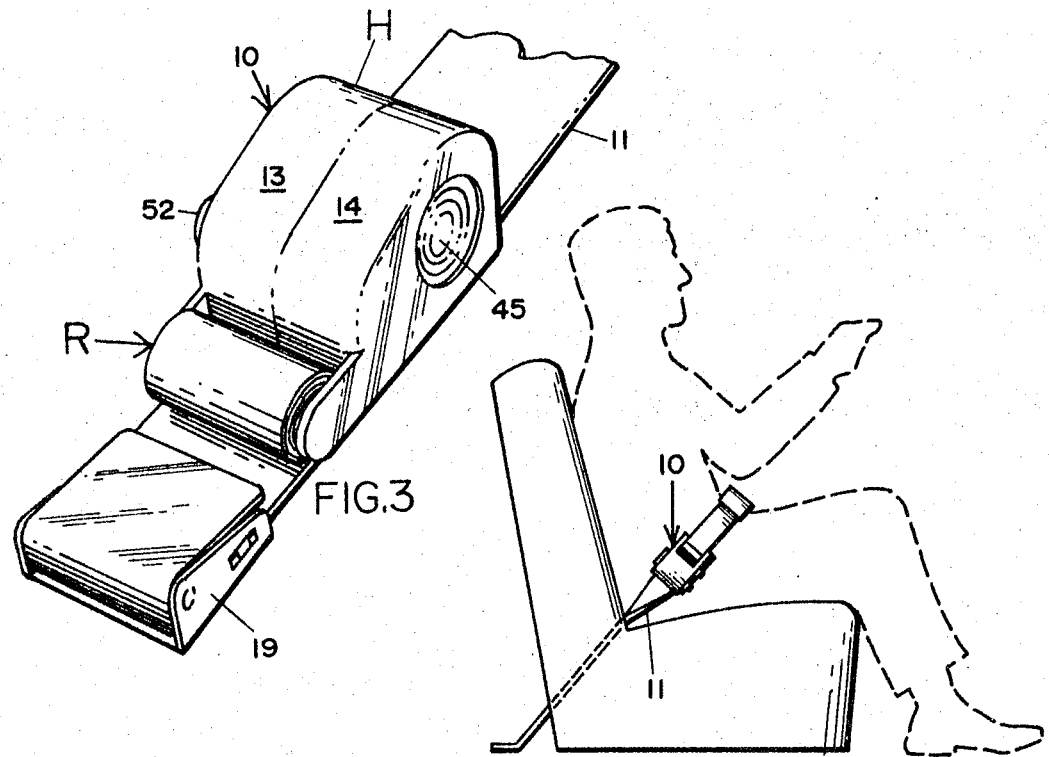
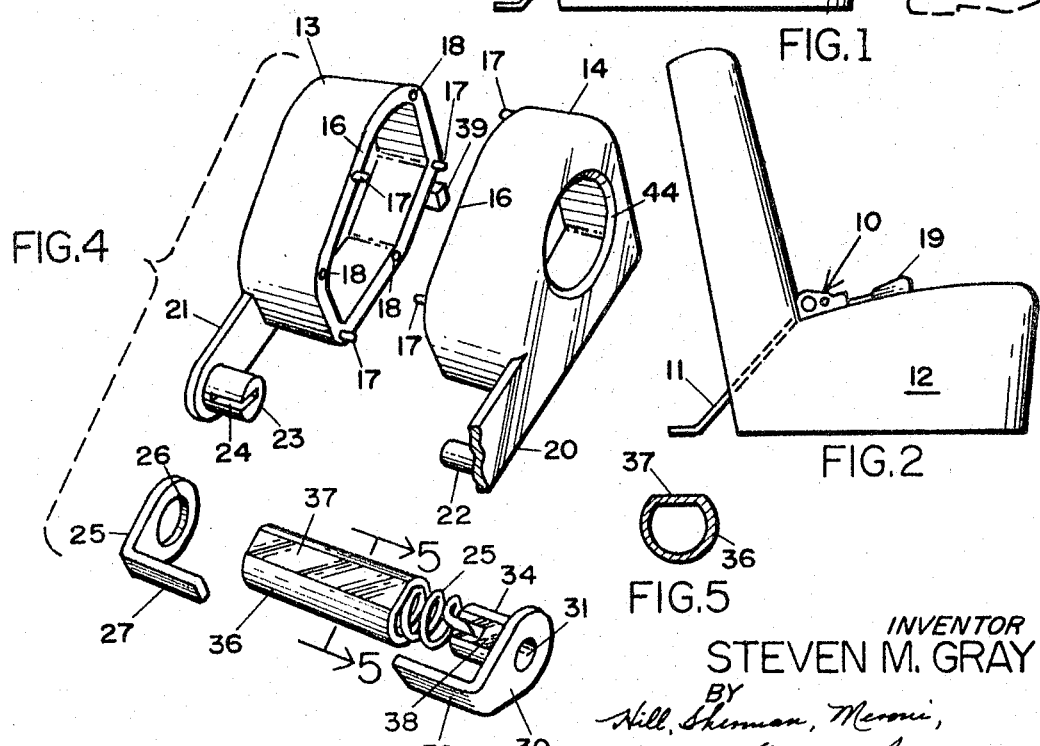
INVENTOR
STEVEN M. GRAY
BY
Hill, Sherman, Meroni,
Gross & Simpson
ATTORNEYS

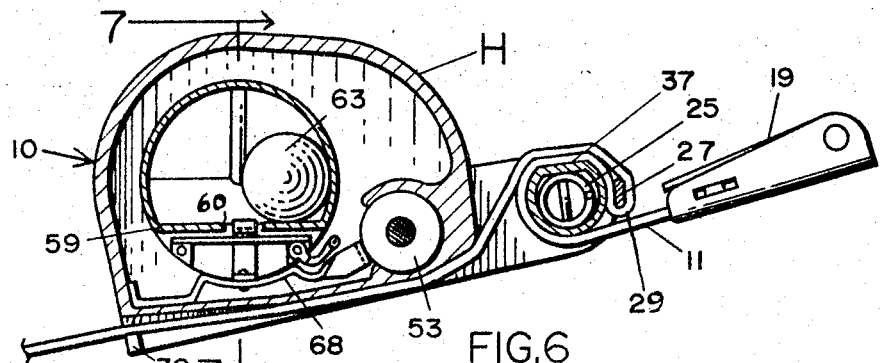
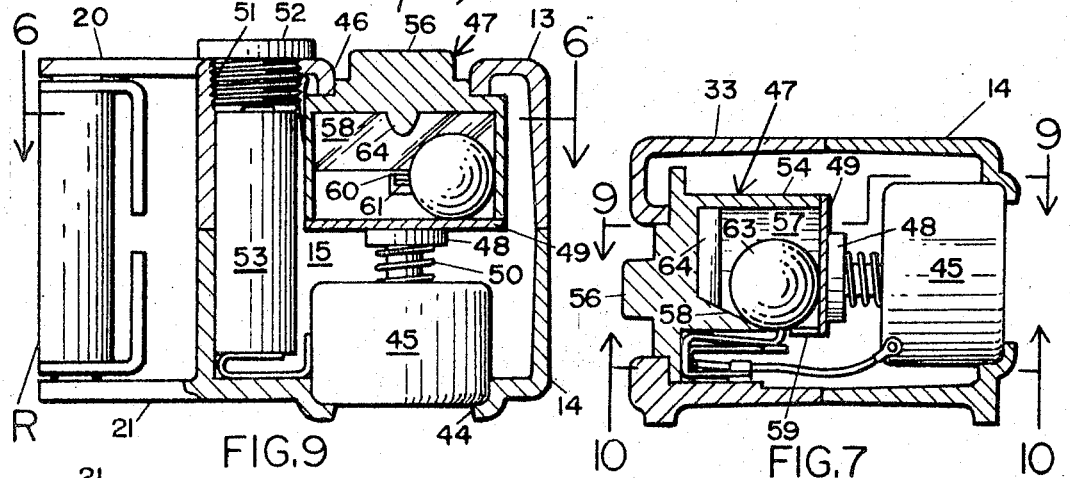
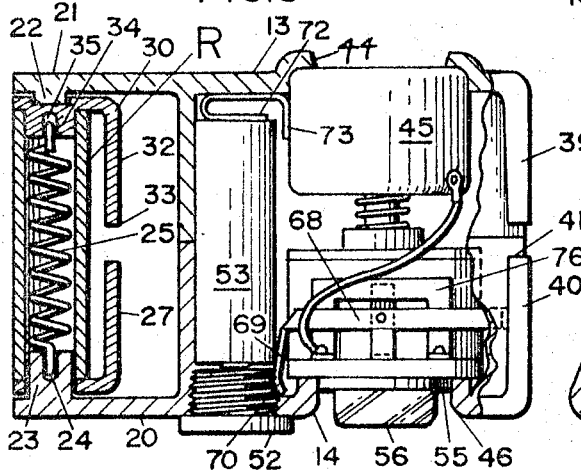
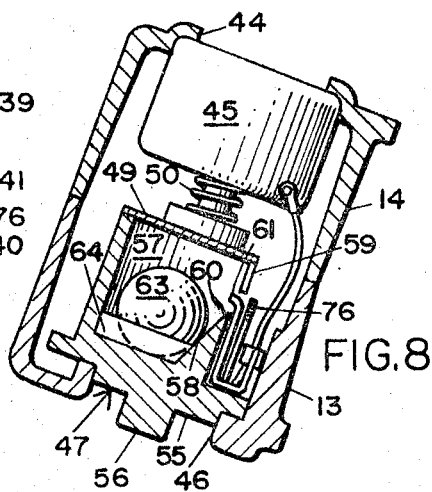
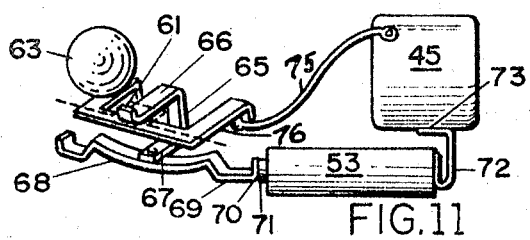
INVENTOR
STEVEN M. GRAY
BY Hill, Sherman, Meroni, Gross & Simpson
ATTORNEYS Aug. 19, 1969        S. M. GRAY        3,462,731

ALARM FOR VEHICLE SAFETY BELTS

Filed Jan. 3, 1966        3 Sheets-Sheet 3

*INVENTOR.*
STEVEN M. GRAY

BY Hill, Sherman, Meroni, Gross & Simpson
*ATTORNEYS*

United States Patent Office 3,462,731
Patented Aug. 19, 1969

3,462,731
ALARM FOR VEHICLE SAFETY BELTS
Steven M. Gray, 1514 Salzedo Ave.,
Coral Gables, Fla. 33134
Filed Jan. 3, 1966, Ser. No. 518,120
Int. Cl. B60q 5/00
U.S. Cl. 340—52                                17 Claims This invention relates generally to signalling devices for use with safety seat belts on motor vehicles and is specifically directed to signalling devices which are fastened to safety seat belts but are otherwise not connected to any other part of the motor vehicle. More specifically, this invention relates to a seat belt signalling device which carries its own source of power and signalling mechanism in a single self-contained unit.

A principal object of the present invention is to provide an alarm device which may be mounted on an already installed seat belt for vehicles wherein upon movement of the vehicle will cause an alarm to be energized if the seat belt is not fastened about a person's waist.

Another object of the present invention is to provide an alarm device readily mounted on a seat belt, which alarm requires no electrical or other connection with the electrical circuitry of the motor vehicle or its ignition system.

A further object of the present invention is to provide an alarm device readily mounted on a seat belt by use of a spring operated retractor which permits placing the warning device in position to energize a warning device in the event the seat belt is not properly fastened about a person's waist when the vehicle is set in motion.

A still further object of the present invention is to provide a warning device for seat belts with an adjustable cage in which there is an open switch engageable by a sphere that is capable of closing the switch only when the seat belt has not fastened about a person's waist.

A still further object of the present invention is to provide a warning device for seat belts which is simple in construction, inexpensive in cost, is readily mounted on an installed seat belt of a vehicle and which operates to emit a warning signal upon movement of the vehicle only when the seat belt has been permitted to remain in its non-use position.

Yet another object of the present invention is to provide a safety seat belt signalling device which is operated from a 1½ volt AA dry cell battery.

Still another object of the present invention is to provide a signalling device for seat belts having a self-contained power supply and signalling mechanism which are energized intermittently to effect long life thereof.

A feature of the present invention is the use of a novel switch which senses motion when positioned in a predetermined plane and which does not sense motion when positioned in a different predetermined plane.

Another feature of the present invention is a seat belt roll up device which may be constructed as an integral part of the seat belt signalling device of the present invention.

With these and other objects and features in view, the invention will best be understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

On the drawings:

FIGURE 1 is a side elevational view of a seat belt having my alarm mounted on a seat belt that is properly tightened about a person and the alarm in its non-operating position;

FIGURE 2 is a similar view with the alarm shown in its alarm rendering position;

FIGURE 3 is a perspective view of my alarm mounted in position on the seat belt;

FIGURE 4 is an exploded view of my alarm shown with the alarm mechanism removed from the casing;

FIGURE 5 is a cross-sectional view taken along the line 5—5 of FIGURE 4 with a coil spring removed;

FIGURE 6 is a cross-sectional view taken along the line 6—6 of FIGURE 9 with the belt shown in position;

FIGURE 7 is a cross-sectional view taken along the line 7—7 of FIGURE 6 showing the alarm in its operative position as it would be in FIGURE 2;

FIGURE 8 is a similar view showing the position of my alarm when the latter is inoperative in the position shown by FIGURE 1;

FIGURE 9 is a cross-sectional view taken along the line 9—9 of FIGURE 7;

FIGURE 10 is a cross-sectional view taken along the line 10—10 of FIGURE 7;

FIGURE 11 is a schematic diagram of the electrical circuit;

As shown on the drawings:

Figure 12:
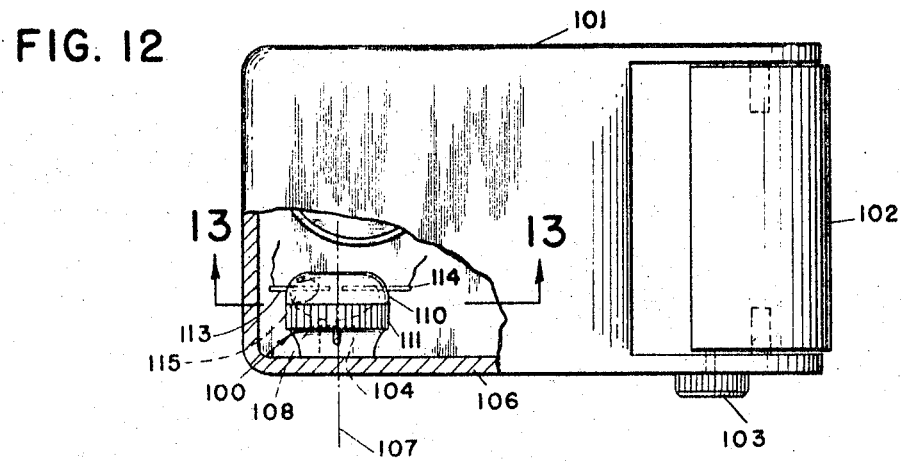
FIGURE 12 is a top plan view of the seat belt warning device with parts broken away to illustrate the position of a mercury switch which is adjustably secured within the warning device housing.

Referring to the drawings wherein like numerals are used to designate similar parts throughout the several views, the numeral 10 refers to an alarm device that is mountable on a seat belt 11 as best shown by FIGURES 1-3 inclusive. The alarm 10 is so constructed as will be explained in detail hereinafter in connection with the drawings that upon movement of a motor vehicle, the alarm will not be sounded if the seat belt 11 has been strapped about a person's body as shown by FIGURE 1 but will emit a loud intermittent sound or buzz if the alarm 10 is permitted to remain on the seat 12 as shown by FIGURE 2. In other words, only upon failure to use the seat belt 11, when the automobile is in motion, will a warning be emitted by my warning device 10.

The warning device 10 consists of a housing H made of two halves 13 and 14 which when cemented together at their mid-portion 16 form a chamber 15 in which the operating mechanism is housed. Extending outwardly of the edges of both the mid-portions 16 are dowels 17 and matching bores 18 which are fitted together to form the completed housing H. Each of the members 13 and 14 are provided with an arm 20, 21.

The alarm device 10 is provided with a belt retractor R consisting of the arms 20, 21 extending forwardly of the body portions 13, 14. Adjacent to the free end of each arm is a cylindrical stem portion 22, 23 which are in axial alignment with each other and extend in a direction toward each other. The stem 23 is provided with a radially disposed slot 24 for receiving the end portion of a coil spring 25 as shown by FIGURE 10.

Rotatably mounted on the stem 23 is an L-shaped belt engaging member 25 having a bore 26 for receiving the stem 23 and a finger portion 27 extending at right angle to the main body thereof. A somewhat similar L-shaped belt engaging member 30 which is rotatably mounted on the other stem 22 consists of a body portion having a bore 31 for receiving the stem 22 and a finger portion 32 which lies in the same plane as that of the other finger portion 27; the fingers 27 and 32 terminate in spaced relation to each other to form a gap or space 33 through which the belt 11 may be threaded in mounting the alarm device 10. Aligned with the bore 31 is a stem 34 which extends inwardly of the belt engaging member 30 so that when the member 30 is mounted on the stem 22, the stem 34 will be aligned with the stem 23, as best shown by FIGURE 10. The stem 34 is provided with a radially disposed slot 35 for receiving the other end of the coil spring 25 that extends between the stems 34 and 23 and housed within a tubular member 36. The tubular member 36 extends between the belt engaging members 25, 30, is rotatably mounted at one end on the stem 23 and is received by the stem 34 at the other end. In order to compel the simultaneous rotation of the tubular member 36 and the belt engaging member 30, a portion of the tubular member 36 and of the stem 34 are made non-arcuate or flat as at 37 and 38. At the other end of the body portions 13 and 14 are stationary belt engaging fingers 39 and 40 which extend toward each other, but terminate a distance apart to form a gap or space 41, of FIGURE 9, through which the belt 11 may be slipped.

From the above description taken in conjunction with the drawings, it is apparent that my alarm 10 may be acquired and placed in position on the seat belt 11 at any time after the seat belt 11 has been installed. All that need be done is place the alarm 10 on the seat 12 where it is desired that it be normally positioned when the seat belt 11 is not in use as shown by FIGURE 2 and the buckle 19 placed in close proximity to the alarm device 10.

Referring to FIGURE 6, the length of seat belt 11 that extends over the seat 12 is then folded in itself as at 29 at approximately the mid-portion of the belt. The fold 29 in the seat belt 11 is then inserted between the fingers 27, 32 through the space 33 after the belt-engaging member 32 had been previously rotated a number of times to place the coil spring 25 in tension. The coil spring 25 will now release its coiled force and wind the belt 11 in a double layer as best shown by FIGURE 6. Then when it is desired to fasten the seat belt 11, all one need do is pull outwardly on the buckle 19 to unwind the belt 11 completely from the reel 36 as the coil spring 25 becomes tensioned. When use of the safety belt 11 is no longer desired, the belt buckle 19 is released and the retractor reel 30, 36, 25 will rewind the belt 11 on the roller 36 and the warning device 10 will find itself upright on the seat 12 as shown by FIGURE 2. To secure the warning device 10 to the belt 11, the belt is threaded through the belt engaging fingers 39, 40 by inserting of the belt 11 through the gap 41, as in FIGURE 9.

Although the warning device of the present invention is shown in conjunction with a safety belt roll up mechanism, it is not to be construed in a limiting sense. The warning device can be fastened to any other means which places the warning device in a predetermined position so that the switching mechanism within the housing 14 is unfailingly returned to its sensing condition when the seat belts are not in use.

The warning mechanism and the apparatus to render the warning mechanism ineffective when the seat belt 11 is being properly used are contained within the chamber 15 of the device 10. The housing member 14 is provided with a single opening 44 in which a horn or buzzer 45 is positioned. In alignment therewith, the housing member 13 is provided with an opening 46 in which a switch cage 47 is rotatably mounted. The switch cage 47 is maintained in position for rotational movement in the opening 46 by means of a spacer member 48 which is secured to the back wall 49 of the switch cage 47 and extends toward the buzzer 45. A coil spring 50 mounted on the spacer member 48 engages the buzzer 45 to yieldingly force the switch cage 47 against the opening 46 thereby maintaining the switch cage 47 in position yet permitting the rotational movement thereof. Adjacent the opening 46 is a threaded opening 51 for receiving a cap 52 and which opening 51 permits the insertion and removal of a battery 53 in the chamber 15.

The switch cage 47 is provided with a cylindrical side wall 54 having a front wall 55 on which an adjusting knob 56 is mounted for rotating the switch cage 47 to its desired position. The rear wall 49 encloses a chamber 57 in which an inclined wall 58 extends across the front half of the bottom portion while the back portion 59 of the bottom wall is flat and normal to the rear and front walls 49, 55.

In the middle of the bottom wall portion 59 is an opening 60 through which a switch contact member 61 extends being so positioned to be actuated by a movable sphere 63 that is free to roll in the chamber 57. When the alarm device 10 is positioned as shown by FIGURES 2 and 7, the sphere 63 will be found on the flat bottom wall portion 59 capable of rolling therealong to engage the contact or switch member 61. However, when the alarm device 10 is positioned as shown by FIGURES 1 and 8, the safety belt 11 being in use, the sphere 63 will roll along the inclined bottom wall portion 58 and become pocketed by a wall 64 mounted on the inside surface of the front wall 55 to prevent any movement of the sphere 63.

In order to permit the switch cage 47 to rotate without affecting the electrical circuit, there is secured to the inside surface of the front wall 55 a U-shaped sliding contact member 65 having a pair of legs 66 and 67. The contact member 61 that is engaged by the roller bearing 63 is mounted on the free end of the leg 66 while the leg 67 slides along an arcuate contact member or cradle 68 which is secured to the base member of the housing 13. The cradle contact member 68 is connected by a conductor 69 to a metallic threaded head 70 mounted on the battery cap 52. The threaded head 70 engages the battery pole 71 when the battery 53 is in position in my alarm 10. The base of the battery 53 engages a spring type connector 72 which is grounded as at 73 to the metallic case of the horn or buzzer 45. The horn 45 is connected by a wire 75 to a contact member 76, which is attached to the inside surface of the switch cage wall 55 and extends to a position slightly below the leg 66 of the sliding contact member 65. Under normal conditions, the contact member 76 is in close but spaced relation to the leg 66. When the ball sphere 63 engages the contact button 61, the contact member 66 is depressed to engage the contact member 76 to close the circuit through the sliding contact member 65, the cradle 68, the battery 53 to energize the horn 45 and sound a warning.

In the normal use of my safety belt warning device 10, after the latter has been positioned on the safety belt 11 as explained hereinabefore, the device 10 is placed on the seat 12 when the motor vehicle is not in use. Since the top surface of seats 12 of most motor vehicles extend at different angles with relation to the horizontal, the adjusting knob 56 is rotated to place the bottom wall 59 in a horizontal position so that any slight motion of the automobile will cause the sphere 63 to roll back and forth on the flat wall 59 of the switch cage 47. However, once adjusted, the switch cage 57 will continue to be thein adjustment.

If the occupant of the motor vehicle does not fasten the seat belt around his waist as shown by FIGURE 1, upon movement of the automobile, the sphere 63 which is in the position within the switch cage 47 as shown by FIGURE 7 will roll back and forth in the chamber 57 depressing the contact member 61 to close the horn circuit momentarily as the sphere 63 engages the member 61. This gives rise to a series of consecutive beeps or buzzes as the automobile travels along the road thus warning the driver or occupant in the automobile that the seat belt 11 is unfastend. The inclined bottom wall 58 prevents the sphere 63 from leaving the flat wall 39 and compels the sphere 63 to engage the contact member 61 each time it rolls from one side to the other.

Upon fastening the seat belt 11 properly about the person's waist, the warning device 10 will assume the position shown by FIGURES 1 and 8. The flat wall 59 assumes a somewhat vertical position while the inclined wall 58 inclines downwardly in the direction of the front wall 55 causing the sphere cage 47 causing the sphere to roll off the flat wall 59 toward the front wall 55 where it is pocketed by the projecting wall 64. Now, the sphere 63 is secured against movement and the contact members 61, 76 remain open so that the movement of the automobile cannot cause the warning signal to be emitted.

Seen in FIGURES 12, 13, 14 and 15 is a modified form of the present invention. A mercury switch 100 is adjustably mounted within a housing 101. The housing 101 may be provided with a suitable roll-up device 102, similar to that described hereinabove. A pin 103 passes through one of the extending legs of the housing 101 and into the roll-up device 102. The pin 103 is used to lock the roll-up device 102 in a predetermined position after a roll-up spring therein has been wound sufficiently to cause the seat belt to retract to a substantially confined but readily accessible position.

The mercury switch 100 is secured to a shaft 104 which, in turn, is mounted to a side wall 106 of the housing 101. The shaft 106 may be cut longitudinally to provide a pair of leg portions which are biased radially outwardly to cause a suitable frictional force to be exerted on the inner wall of the switch housing to maintain the switch 100 in a predetermined position. However, it may be desirous to rotate the switch 100 about an axis 107 therethrough. A pluranlity of teeth 108 are provided on the switch 100 to facilitate gripping when it is desired to rotate the switch 100 about the axis 107.

Figure 13:
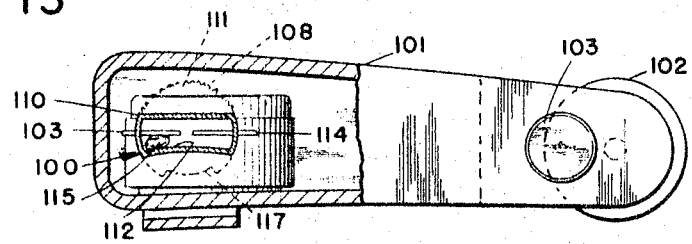
FIGURE 13 is a partial sectional view taken along the line 13—13 of FIGURE 12 to show the detail construction and operation of the novel mercury switch.
Figure 14:
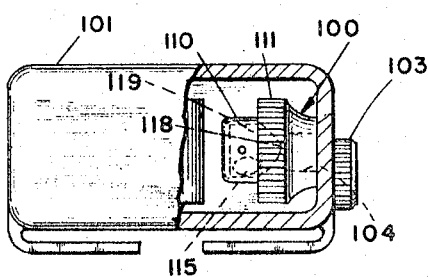
FIGURE 14 is an elevational view of the warning device of FIGURE 12 showing the operation of the novel mercury switch when the warning device is positioned in a substantially horizontal plane as on an automobile seat.

Seen in FIGURE 13 is a partial sectional view taken along the line reference numeral XIII—XIII of FIGURE 12. The mercury switch 100 has a substantially rectangular body portion 110 which is secured to a substantially circular body portion 111. A wall 112 is curved inwardly to form an arcuate mercury track for the switch 100. As the mercury travels along the track 112 it bridges the gap between a pair of electrodes 113 and 114. The electrodes 113 and 114 may be connected to the battery end signaling mechanism within the housing 101. Therefore, when the mercury 115 bridges the gap between electrodes 113 and 114, an intermittent signal is generated to indicate that the safety seat belts are not in use.

By way of example, when the safety seat belts are not being used, the signalling device will lay on the seat next to the driver. The switch 100 will be substantially in the position shown in FIGURES 12, 13 and 14. When the automobile is moving, inertial forces of the automobile are sensed by the mercury 115 within the switch 100. These inertial forces cause the mercury 115 to travel back and forth over the track 112, and intermittently bridge the gap between electrodes 113 and 114 to cause intermittent energization of the signalling mechanism.

Should the slope of the seat of the automobile be such as to cause the mercury 115 to collect at one end of the switch body 110, the switch 100 may be rotated about the axis 107, of FIGURE 12. Therefore, the switch 100 can be placed substantially in a horizontal position, as seen in FIGURE 13, regardless of the position of the housing 101. A notch 117 may be provided to engage a suitable stop, not shown, to limit the angle of rotation about the axis 107.

Figure 15:
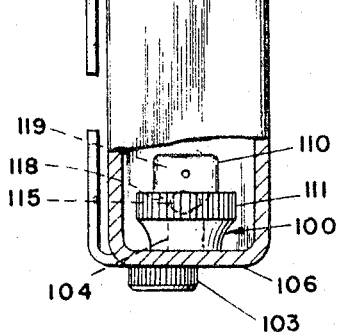
FIGURE 15 is an elevational view of the warning device showing the position of the mercury switch when the device is in a substantially vertical plane as when in use.

When the safety seat belts are in use, the signaling device will acquire substantially the position shown in FIGURE 15. The mercury track 112 and the adjacent walls thereto, and the opposite wall thereof, together with a concave surface 118 form a mercury chamber 119. When the safety seat belts are in use and the signaling device is in the position shown in FIGURE 15, the mercury will fall, or be pocketed, by the concave surface 118 thereby preventing the mercury from engaging the electrodes 113 and 114. Therefore, when the safety seat belt is in use, the switch 100 is disabled to prevent energization of the signaling mechanism within the housing 101.

In summary, the present invention has provided a signaling device for safety seat belts on motor vehicles. The device includes means for sensing the movement of the vehicle to cause energization of the signaling mechanism if the seat belts are not used when the vehicle is in motion. Furthermore, the device of the present invention is arranged to be operated from an AA size dry cell battery which is easily accesible for replacement. However, a novel switching arrangement allows the battery and signaling mechanism to be energized intermittently without detracting from the purpose of the signaling device, thereby causing long life of the battery. In the preferred embodiment of the present invention, all of the current carrying parts of the housing assembly may be silver plated.

Although several embodiments of the present invention have been shown, they are not to be construed in a limiting sense. It will be understood that variations and modifications may be effected without departing from the spirit and scope of the novel concept of this invention.

I claim as my invention:

1. A signaling device for safety seat belts of motor vehicles including:
   a housing arranged to be fastened to the safety seat belt;
   a power supply carried within said housing;
   a signaling mechanism carried within said housing and disposed for connection to said power supply; and
   switch means connected between said power supply and said signaling mechanism to energize said signaling mechanism when the motor vehicle is in operation and when the safety seat belts are not used, and said switch means being disabled when the safety seat belts are in use.

2. The signaling device of claim 1, wherein said power supply is an AA size dry cell battery.

3. The signaling device of claim 1, wherein said switch means is sensitive to the movement of the motor vehicle.

4. The signaling device of claim 1, including a safety seat belt roll-up mechanism to maintain the safety seat belt in a comparatively confined but readily accessible position when not in use.

5. The signaling device of claim 4, including momentary contact switch means connected between said power supply and said signalling mechanism and actuated by sensing movement of the motor vehicle.

6. The signaling device of claim 1, including a momentary contact switch means connected between said power supply and said signaling mechanism and actuated by sensing movement of said motor vehicle.

7. The signaling device of claim 1, wherein said switch means is actuated by a freely movable body responsive to the movement of the motor vehicle.

8. The signaling device of claim 1, wherein said switch means consists of a mercury switch having a curved mercury track which allows the mercury to move freely upon sensing motion and said mercury switch has a concave pocket for containing the mercury thereby disabling the switch when the safety seat belt is in use.

9. The signaling device of claim 1 further including a freely movable actuator; and means directing the movement of said actuator over said switch means when said housing assumes one position and further means directing said actuator in a direction removed from said switch means when said housing assumes a position other than said one position.

10. The signaling device of claim 1 further including, a roll-up mechanism mounted on said housing to maintain the safety seat belt in a comparatively confined but readily accessible position when not in use; a freely movable actuator; and means directing the movement of said actuator over said switch means when said housing assumes one position and further means directing said actuator in a direction removed from said switch means when said housing assumes a position other than said one position.

11. The signaling device of claim 1, wherein said switch means comprises:
    a switch cage mounted in said housing, said switch cage having a substantially horizontally disposed bottom wall portion and an obliquely disposed bottom wall portion joining said horizontally disposed bottom wall portion, said horizontally disposed bottom wall portion having an opening;
    a switch contactor mounted in said housing and extending through said opening; and
    a freely movable body positioned in said switch cage whereby said body will move along said horizontally disposed bottom wall portion and engage said switch contactor when said housing assumes one position and said body will move along said obliquely disposed bottom wall portion away from said horizontally disposed bottom wall portion and said switch means when said housing assumes another position.

12. The signalling device of claim 1 wherein said switch means comprises:
    a switch cage;
    means rotatably mounting said switch cage in said housing;
    handle means mounted on said switch cage for adjusting said switch cage in said housing, said switch cage having a substantially horizontally disposed bottom wall portion and an obliquely disposed bottom wall portion joining said horizontally disposed bottom wall portion, said horizontally disposed bottom wall portion having an opening;
    a switch contactor mounted in said housing and extending through said opening; and
    a freely movable body positioned in said switch cage whereby said body will move along said horizontally disposed bottom wall portion and engage said switch means when said housing assumes one position and said body will move along said obliquely disposed bottom wall portion away from said horizontally disposed bottom wall portion and said switch means when said housing assumes another position.

13. The signaling device of claim 1 wherein said switch means comprises:
    a switch housing;
    a chamber formed in said switch housing;
    said chamber having a concave surface and an inwardly curved surface adjacent thereto;
    a pair of stationary electrical contacts extending through said switch housing and terminating in the said chamber; and
    a quantity of mercury in said chamber to make electrical contact between said pair of stationary electrical contacts when said mercury is movable on said inwardly curved surface, and to prevent electrical contact between said stationary electrical contacts when said merucury is movable on said concave surface.

14. The switch means of claim 13 wherein said switch housing is formed of two moldable parts.

15. The switch means of claim 14 wherein teeth are formed on one of said moldable parts, and an arcuate notch is formed on said housing opposite said teeth.

16. The switch means of claim 14 wherein said pair of stationary contacts are in alignment with a common axis through said chamber.

17. The switch means of claim 13 wherein said switch housing is formed of first and second body portions, said first body portion being substantially rectangular and having an aperture in opposing end walls along an axis through the longitudinal dimension of said first body portion and having an inwardly curved surface formed on an inner wall, and further having a rectangular opening formed in one side thereof adjacent said inwardly curved surface and longitudinal therewith, said second body portion being substantially circular having a plurality of teeth formed in a circular portion of the periphery thereof, and having an arcuate notch formed in the circular periphery opposite the plurality of teeth, and further having said concave surface formed in one side wall thereof, said first and second body portions being secured together to form said chamber; wherein said pair of stationary contacts extend through said apertures and into said chamber along an axis parallel to the rectangular opening of said first body portion.

References Cited

UNITED STATES PATENTS 3,226,674  12/1965  Eriksson _____ 340—278 XR

ALVIN H. WARING, Primary Examiner

U.S. Cl. X.R.

180—82; 200—61.45